June 18, 1957 E. FEINSTEIN 2,796,033
METHOD OF FORMING A CONFECTION PACKAGE
Filed July 6, 1954 2 Sheets-Sheet 1
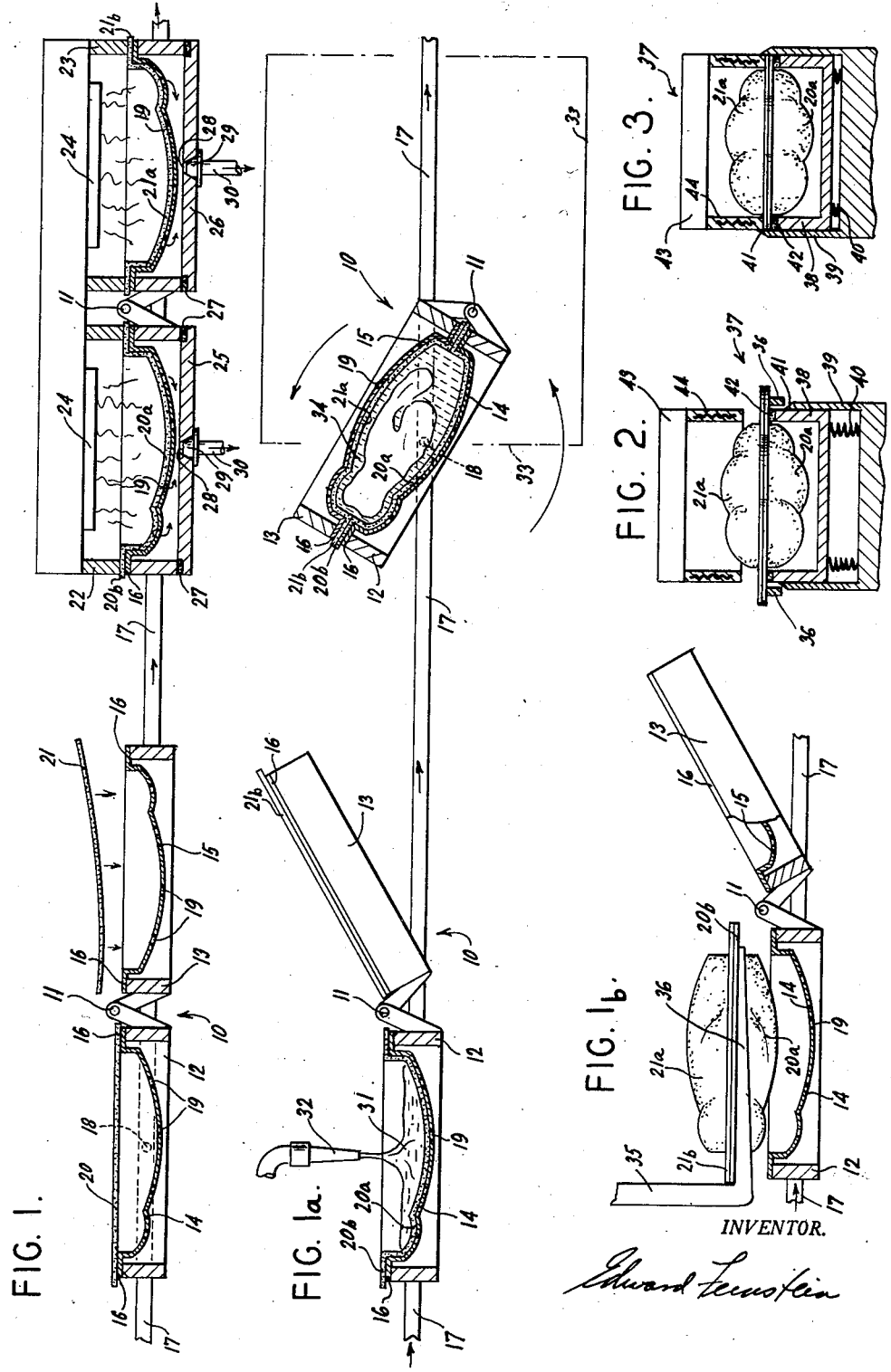
INVENTOR.
Edward Feinstein June 18, 1957   E. FEINSTEIN   2,796,033
METHOD OF FORMING A CONFECTION PACKAGE
Filed July 6, 1954   2 Sheets-Sheet 2

INVENTOR.
Edward Feinstein

United States Patent Office 2,796,033
Patented June 18, 1957

2,796,033

METHOD OF FORMING A CONFECTION PACKAGE

Edward Feinstein, New York, N. Y.

Application July 6, 1954, Serial No. 441,410

7 Claims. (Cl. 107—54)

My invention relates to an article of manufacture consisting of a chocolate figure sealed within a plastic container of the same shape and configuration, and also to the process and apparatus for manufacturing such item.

Hollow chocolate figures are well-known in the confectionary trade, these figures generally being sold in a loosely-fitting cellophane wrapping or in a wrapper of metal foil or the like. The wrapper, once removed, loses its shape and is torn, so that it is of no further use and is discarded.

In the conventional manufacturing of hollow chocolate figures, the chocolate is molded in metal molds, then removed and wrapped. According to my invention, I utilize plastic molds therein of the same shape and configuration. The chocolate is then molded directly in the plastic molds and after the chocolate figure has hardened and formed, the plastic mold is then sealed together to form an attractive package for the chocolate figure. In use, the chocolate figure may be removed from the plastic mold package and the plastic mold reassembled to form a hollow toy figure, so that it has a continuing use apart from the chocolate figure.

The plastic package provides an effective tightly-sealed container for the chocolate form, retarding spoilage of the chocolate, and in addition is rigid or semi-rigid so that it helps prevent accidental breakage of the chocolate.

Additional objects and advantages of my invention will be found in the course of the following specification when taken in connection with the accompanying drawings, in which:

Figs. 1, 1a, and 1b show schematically five successive stations or stages in the manufacture of the chocolate figure and its package, the mold assembly shown therein being carried to these successive stations by a continuous belt 17.

Figs. 2 and 3 are sectional views showing the plastic package and its contained chocolate form in an assembly for trimming and sealing the package.

Figure 4:
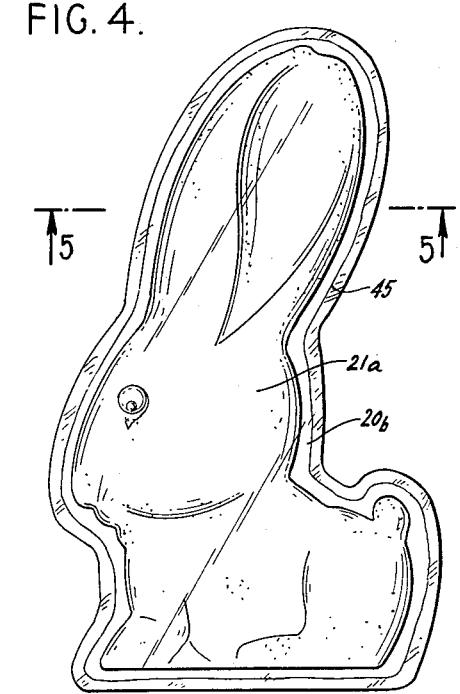
Fig. 4 is a side elevation of the plastic package containing a chocolate figure.

Figs. 1, 1a, and 1b show successive steps in the manufacture of the assembled package unit which consists of a hollow chocolate figure encased in a plastic container of the same configuration.

Fig. 1 shows a mold assembly generally designated by the reference numeral 10 which includes two rectangular frames 12 and 13 of similar size and shape joined by a hinge 11. Each frame 12 and 13 is open at its top and bottom. The hinge 11 is of such construction as to allow the frames to lie in the open, side-by-side relationship shown at the left of Fig. 1, and also to be brought to a closed position shown at the right of Fig. 1a, in which frame 13 overlies frame 12.

Each frame 12 and 13 carries a respective mold section 14 and 15 constituting the two halves of a completed mold in the form of a selected figure, when fitted together. Each mold section is made of thin metal sheet material, preferably copper or an equivalent metal which conducts heat rapidly, and is provided with a plurality of small perforations 19 scattered across its surface. The mold sections 14 and 15 are each bordered by an integral continuous peripheral flange 16 which is large enough to overlie the top edge of the frame, so that the mold sections 14 and 15 may be seated in the respective frames 12 and 13 in the manner shown in Fig. 1. The mold sections may be attached to the frames in any suitable manner, for example by screws extending through the flanges 16 and into the body of the frames.

Means are provided for moving the frames and their attached mold sections successively through various stations representing successive stages of the manufacturing operation, and for automatically providing a rest or dwell period at each station while the operation is performed. Such means are common in manufacturing operations of the assembly-line type and may consist, for instance, of the well-known automatic rotating table, endless belt, or the like. For purposes of illustration, an endless belt 17 is shown in the drawings for transporting the mold assembly to the successive manufacturing stations. The belt 17 is driven by suitable drive means and controlled by a dwell assembly which are of conventional construction and are therefore not shown herein. The frame 12 is attached to the belt 17 at its center by a pivot 18, for purposes of tumbling or turning said frame end-over-end, as will be later described, but is normally maintained horizontal or parallel to said belt 17, as shown in Fig. 1.

The first stage or station in the manufacturing operation is shown at the left-hand side of Fig. 1. In this stage, two sheets of plastic 20 and 21 are placed automatically across the tops of the respective mold sections 14 and 15. These plastic sheets are slightly longer than the mold sections and are appreciably greater in width, so that the ends of said sheets 20 and 21 extend beyond the peripheral flanges 16 of the mold sections especially at the sides thereof. This enables the formed plastic to be readily removed from the mold sections at a later stage as shown in Fig. 1b and as will be later described. The sheets 20 and 21 are made of a suitable thermoplastic material which is normally rigid or semi-rigid, but which will soften when heated.

The belt 17 now transports the mold assembly 10 to the second station shown at the right-hand side of Fig. 1, in which heating units and vacuum units are brought into operative association with the molds. The heating units consist of a pair of clamping frames 22 and 23 which are of the same size and shape as the frames 12 and 13 and which are open at their bottom ends. The clamping frame 22 and 23 are pressed down upon the top edges of the frames, or rather upon the upper edge surfaces of the plastic sheets 20 and 21 overlying the frames, so as to clamp the peripheral edge portions of the sheets 20 and 21 tightly against the respective mold flanges 16, and also to enclose the concavities of the mold sections 14 and 15. The heating units each contain a heating element 24 which heat the interior of said unit and causes the central portion of the plastic sheet enclosed therein to soften.

The vacuum units are applied simultaneously with the heater units and consist of a pair of flat plates 25 and 26 each bordered by a resilient gasket 27. The plates 25 and 26 are pressed firmly against the bottom open ends of the frames 12 and 13, the gaskets 27 forming an air-tight seal around the bottom edges of said frames. Each plate 25 and 26 has a central opening 28 in which is fitted a vacuum nozzle 29 connected by a pipe 30 to the usual vacuum pump (not shown). As the plastic sheets 20 and 21 are softened by the heater elements 24, the suction created by the vacuum nozzles 29 passes through the perforations 19 in the copper molds 14 and 15 and draws the softened plastic sheets downwardly into the concavities of the molds as shown at the right of Fig. 1. The plastic sheets thus assume the shape of the mold concavities, becoming liners therefor, and themselves become auxiliary plastic molds 20a and 21a in the subsequent formation of the chocolate article. It will be noted that the formed plastic molds 20a and 21a are formed with integral bordering flanges 20b and 21b which overlie the flanges 16 of the copper mold sections 14 and 15.

After the plastic molds 20a and 21a are formed, the heating and vacuum units are removed and the plastic is given sufficient time to cool so that the plastic molds harden and rigidify. The mold assembly is then brought by belt 17 to the third station shown at the left-hand side of Fig. 1a in which warm molten chocolate 31 is poured into the concavity of the plastic mold 20a carried by frame 12 through a nozzle 32 connected to a suitable reservoir (not shown). It will be noted that the molten chocolate 31 only partially fills the plastic mold 20a.

The frames 12 and 13 are then folded on their hinges and locked in their closed position, causing the plastic mold sections 20a and 20b to form a complete mold of the selected figure which is encased within the completed or assembled copper mold. The frames 12 and 13 in their locked closed position press the peripheral flanges 20b and 21b of the plastic mold sections firmly together in flush and alined relationship, so that none of the molten chocolate can escape from the joined edges of the plastic mold sections.

The mold assembly is then transported by belt 17 to the fourth station shown at the right-hand side of Fig. 1a, in which the frames are tumbled or turned to cause the molten chocolate to swirl around the interior of the plastic mold. This tumbling is performed automatically so that the frame 12 revolves rapidly and eccentrically on its pivot 18. The construction of the tumbling mechanism is not claimed as such and is therefore not shown in detail. The tumbling of the mold assembly causes the molten chocolate to swirl or tumble about in the closed plastic mold. While it is in the act of tumbling, the mold assembly enters a cooling tunnel shown diagrammatically at 33, where it continues in its tumbling action. Since the frames 12 and 13 are open at top and bottom and since the copper mold sections 14 and 15 conduct heat rapidly, the heat of the molten chocolate is dissipated through the thin copper mold walls, causing the chocolate to cool and harden along the walls of the plastic mold sections 20a and 21a. This results in the hardening of the chocolate along the walls of the plastic mold, so that a chocolate figure 34 having the form defined by the plastic mold is formed with a hollow center.

After the chocolate has completely cooled and rigidified at the end of the rocking operation, the mold assembly is then transported by the belt 17 to the fifth station in which the frames are opened and the plastic mold and its contained chocolate figure is lifted from the mold assembly. This is accomplished by means of a member 35 having spaced parallel arms 36 which are slid beneath the projecting sides of flanges 20b of the lower plastic mold section 20a. The plastic mold 20a, 21a and its contained chocolate figure 34 are then lifted from the copper mold section 14 and brought to a sealing apparatus 37 shown in Fig. 2.

The sealing apparatus 37 comprises a box-like bed 38 which is slidably and telescopically mounted in a hollow base 39, springs 40 normally urging the bed 38 upwardly in the base 39 in the position shown in Fig. 2, so that the open end of bed 38 projects above the top of base 39. The free top edge of the base 38 is sharpened to form a peripheral upstanding knife edge 41 shaped to conform to the outer configuration of the plastic mold. The top of the bed 38 is lined by a resilient strip 42.

The plastic mold and its contained chocolate form is deposited on the bed 38 by the arms 36 which are then withdrawn, in the position shown in Fig. 2, the flange 20b of mold section 20a resting on the resilient strip 42. A sealing unit in the form of a lid 43 having depending metallic walls containing heating elements 44 is then brought down firmly upon the flange of the plastic mold, the heated wall compressing the plastic mold flanges 20b, 21b against the resilient strip 42. Two operations are now performed simultaneously. The heat of the heating elements 44 transmitted through the metal walls of the lid 43 seals the plastic mold sections 20a, 21a at a continuous line around the flanges 20b, 21b, which line is spaced a distance outwardly from the body of the mold sections. At the same time, the downward pressure of the lid 43 depresses the bed 38 within the base 39 against tension of the springs 40, causing the plastic flanges 20b, 21b to be brought downwardly through the knife edge 41 so that the flanges 20b, 21b are trimmed immediately outwardly of the heat seal, as shown in Fig. 3.

Figure 5:
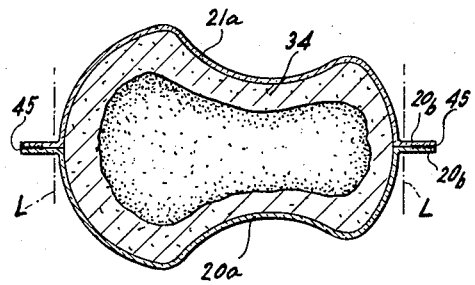
Fig. 5 is a section along line 5—5 of Fig. 4.

Figs. 4 and 5 show a plastic-covered chocolate figure in the illustrative form of a rabbit, formed by the process and mechanism previously described. This article consists of the plastic mold sections 20a and 21a having the integral peripheral flanges 20b and 21b which are joined by a peripheral line of sealing 45 along their outer edges, the line of sealing 45 being spaced from the body of the mold sections. In this form, the article is suitable for sale, the hollow chocolate figure 34 of the same shape and configuration as the mold sections being tightly encased in the mold sections and effectively sealed therein. It will be appreciated that while the mold sections 20a, 20b served to form the hollow chocolate figure during the manufacturing operation, the mold sections in the assembled form of the article become the package for the chocolate figure. For this purpose, the mold sections may be transparent, or may be opaque or suitably colored.

Figure 6:
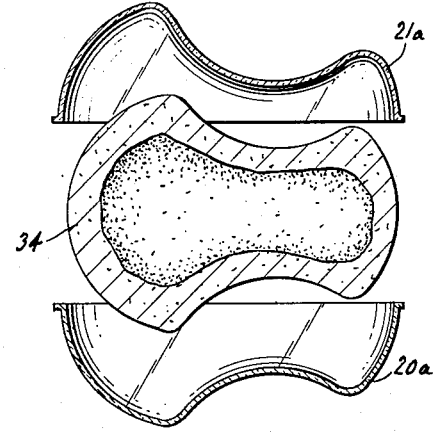
Fig. 6 is a section similar to Fig. 5 but showing the chocolate figure in the process of being removed from its plastic package.

When it is desired to remove the chocolate figure, the sealed portion 45 of the flanges 20b, 21b is cut away with a scissors or knife, substantially along the line L shown in Fig. 5, leaving a portion of the unsealed flanges bordering the mold sections. The mold sections are then opened and the chocolate figure 34 removed for eating, as shown in Fig. 6.

Figure 7:
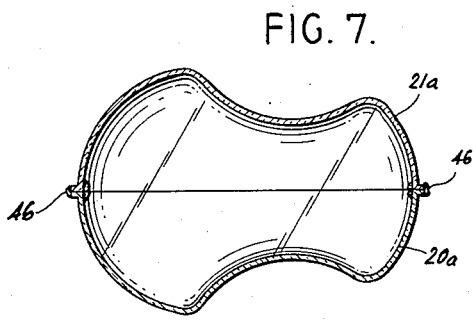
Fig. 7 is a section taken along line 7—7 of Fig. 8.
Figure 8:
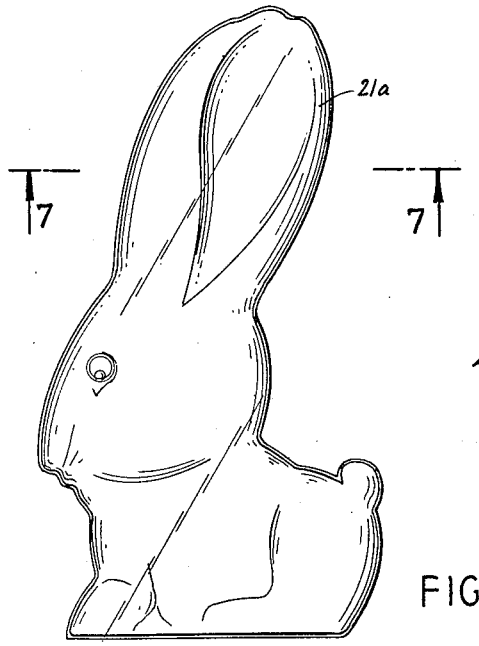
Fig. 8 is an elevation of the empty plastic package as it is refitted together after the chocolate figure is removed therefrom.

Since the mold sections 20a, 21a are made of rigid or semi-rigid plastic, they may be re-assembled to form a hollow plastic toy. For this purpose the mold sections are fitted together as shown in Figs. 7 and 8 and secured together through the remaining portion of the flanges 20b, 21b, as by the use of cement 46 or other equivalent means. If the mold sections are colorless, they then provide a source of entertainment for a child, since the figure may then be colored, either inside or outside, according to the child's selection. For play purposes, the molds may be made in various related forms such as in a set of toy soldiers, or as different animals of a zoo, etc.

While a preferred embodiment of the invention has been shown and described herein, it is obvious that numerous changes, omissions and additions may be made without departing from the spirit and scope of the invention. For example, while a chocolate figure has been referred to, any edible matter which can be molded may be substituted for chocolate. In addition, the figure may be made solid, if desired, instead of hollow.

I claim:

1. A method of forming a confectionary figure snugly encased within a sealed shape-retaining plastic container of the same shape and configuration, said method comprising the steps of heating a pair of thermo-plastic sheets, introducing said sheets into metal mold half-sections applying pressure to said sheets to cause them to take the form of the mold cavities, and allowing the molded thermo-plastic sheets to cool to form plastic mold half-sections, pouring molten confectionary material within at least one of the plastic mold sections and fitting said mold sections together to form a complete closed plastic mold, allowing the molten confectionary material to cool to form the confectionary figure within the plastic mold, and then sealing the plastic mold half-sections together around the entire periphery of the confectionary figure to form the sealed plastic container for said confectionary figure.

2. A method of forming a confectionary figure snugly encased within a sealed shape-retaining plastic container of the same shape and configuration, said method comprising the steps of heating a pair of thermo-plastic sheets, introducing said sheets into metal mold half-sections applying pressure to said sheets to cause them to take the form of the mold cavities and allowing the molded thermo-plastic sheets to cool to form hollow plastic mold half-sections, pouring molten chocolate within at least one of the plastic mold sections and fitting said mold sections together to form a complete closed plastic mold, allowing the molten chocolate to cool within the mold to form the confectionary figure completely filling said mold, and then sealing the plastic mold half sections together around the entire periphery of the confectionary figure to form the sealed plastic container for said molded confectionary figure.

3. A method of forming a hollow chocolate figure snugly encased within a sealed plastic container of the same shape and configuration, said method comprising the steps of heating a pair of thermo-plastic sheets, introducing said sheets into metal mold half sections, applying pressure to said sheets to cause them to take the form of the mold cavities, and allowing the molded thermo-plastic sheets to cool to form shape-retaining hollow plastic mold sections, the sections each being formed with an integral laterally-extending flange extending around the periphery of the plastic mold sections, pouring molten chocolate within one of the plastic mold sections, fitting the plastic mold sections together to form a complete closed plastic mold with the flanges thereof in firm abutment agitating the plastic mold while the molten chocolate cools and hardens to cause the molten chocolate to swirl and thereby form in cooling a hollow chocolate figure within the plastic mold, and then heat-sealing the flanges of the plastic mold half-sections together around the entire periphery of said chocolate figure to form the sealed plastic container for said hollow chocolate figure.

4. A method according to claim 3 in which the plastic flanges are heat-sealed along a peripheral line spaced laterally outward from the body of said plastic container.

5. A method of forming a hollow chocolate figure snugly encased within a sealed plastic container of the same shape and configuration, said method comprising the steps of placing a pair of thermo-plastic sheets in metal mold half sections, softening said sheets by heat and applying vacuum to draw said sheets against the interior of the respective mold half sections whereby each sheet lines and assumes the shape of the cavity of the metal mold half section, allowing the molded thermo-plastic sheets to cool to form shape-retaining hollow plastic mold sections within the mold half sections, the plastic mold sections each being formed with an integral laterally-extending flange extending around the periphery thereof, pouring molten chocolate within one of the plastic mold sections, fitting the plastic mold sections together to form a complete closed plastic mold with the flanges thereof in firm abutment, agitating the plastic mold while the molten chocolate cools and hardens to cause the molten chocolate to swirl and thereby form in cooling a hollow chocolate figure within the plastic mold, and then heat-sealing the flanges of the plastic mold half sections together around the entire periphery of said chocolate figure to form the sealed plastic container for said hollow chocolate figure.

6. A method according to claim 5 in which the thermo-plastic sheets are at least partially rigid after molding.

7. A method according to claim 5 in which the temperature at which the thermo-plastic sheets soften is appreciably higher than the temperature of the molten chocolate.

References Cited in the file of this patent
UNITED STATES PATENTS

| Number | Name | Date |
|---|---|---|
| 927,435 | Sigrist | July 6, 1909 |
| 1,583,839 | Johnston | May 11, 1926 |
| 1,649,307 | Hunter | Nov. 15, 1927 |
| 1,780,091 | Meinhofer | Oct. 28, 1930 |
| 1,898,194 | Lidsky | Feb. 21, 1933 |
| 1,908,769 | Lantinberg et al. | May 16, 1933 |
| 2,166,568 | Kuhlke | July 18, 1939 |
| 2,578,361 | Kappel | Dec. 11, 1951 |
| 2,651,154 | Nicolle | Sept. 8, 1953 |
| 2,688,557 | Peters | Sept. 7, 1954 |
| 2,698,248 | Peters | Dec. 28, 1954 |